July 3, 1951

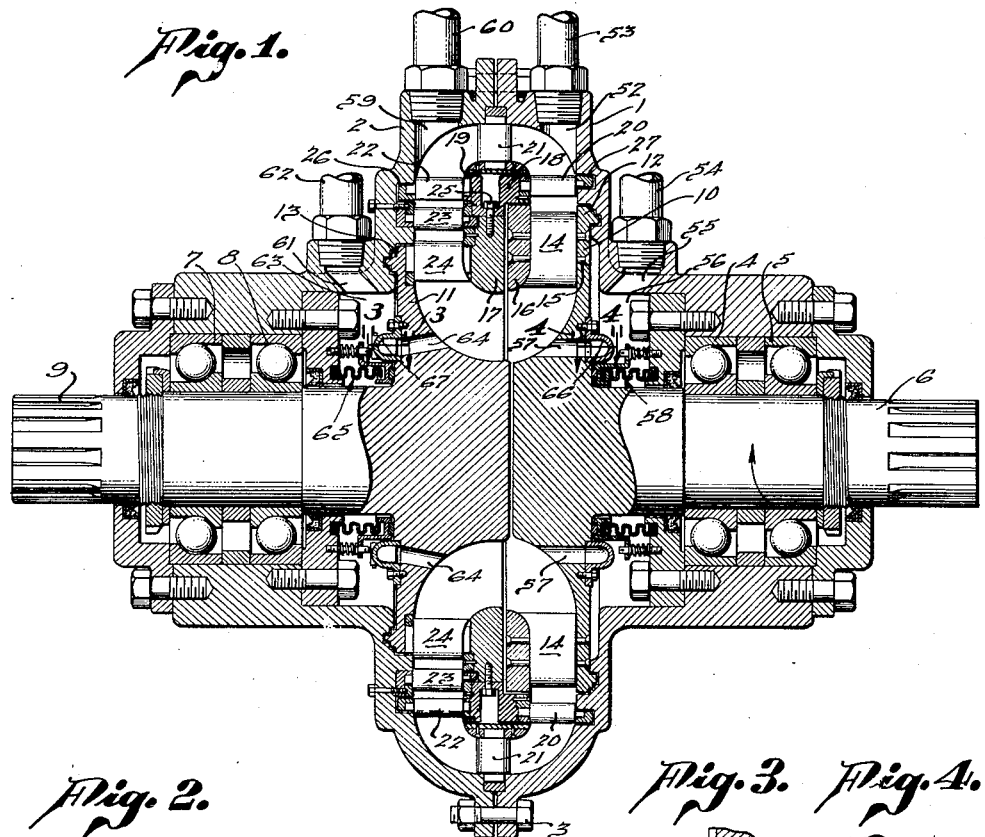

C. M. O'LEARY 2,558,976

ROTARY HYDROKINETIC TORQUE CONVERTER WITH COOLING SYSTEM

Filed April 10, 1947

Charles M. O'Leary
INVENTOR.

BY
Harness, Dickey & Pierce
ATTORNEYS.

Patented July 3, 1951

2,558,976

UNITED STATES PATENT OFFICE 2,558,976

ROTARY HYDROKINETIC TORQUE CONVERTER WITH COOLING SYSTEM

Charles M. O'Leary, Los Angeles, Calif.

Application April 10, 1947, Serial No. 740,673

11 Claims. (Cl. 60—54)

The present application is a continuation-in-part of applicant's copending application, Serial No. 666,626, filed May 2, 1946.

It is the general object of the present invention to provide a hydrokinetic torque converter of improved design and construction which is particularly characterized by its ruggedness, ease of assembly and low cost.

It is a further object of the present invention to provide a torque converter of the type mentioned which is particularly suited for use in driving hoisting drums or in similar applications wherein the output member of the converter is required to remain stationary or rotate at relatively high speeds in reverse for extended periods when the converter is acting to hold the load stationary or is acting as a brake during lowering of the load.

Another object of the invention is to provide a hydrokinetic torque converter having improved means for preventing cavitation of the operating liquid, which means is particularly designed to prevent cavitation of the operating liquid under high-speed reverse rotation of the output or turbine member of the converter.

Another object of the invention is to provide an improved liquid circulating and cooling system for a torque converter, including means to control the rate of flow and the pressure of the liquid both in the converter and in the cooling radiator.

Other objects and advantages of the invention will become apparent from the following specification, the accompanying drawings and the appended claims.

In the drawings:

Figure 1 is a longitudinal section through the preferred form of the invention;

Figure 2 is a fragmentary section similar to Figure 1 but on a large scale, showing a portion of the blade construction and mounting;

Figure 3 is a fragmentary section taken on the line 3—3 of Figure 1;

Figure 4 is a fragmentary section taken on the line 4—4 of Figure 1;

Figure 5:
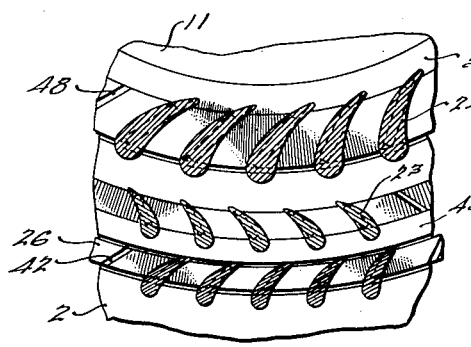
Figure 6:
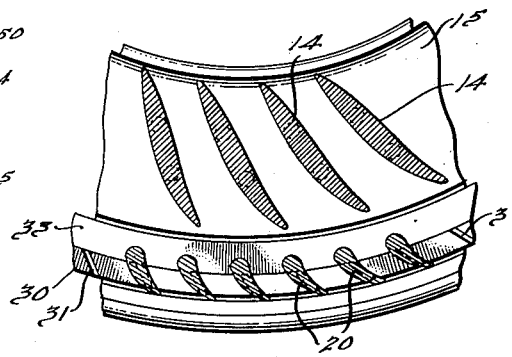
Figure 7:
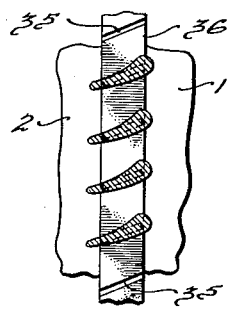
Figure 8:
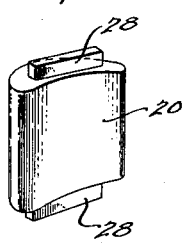
Figure 9:
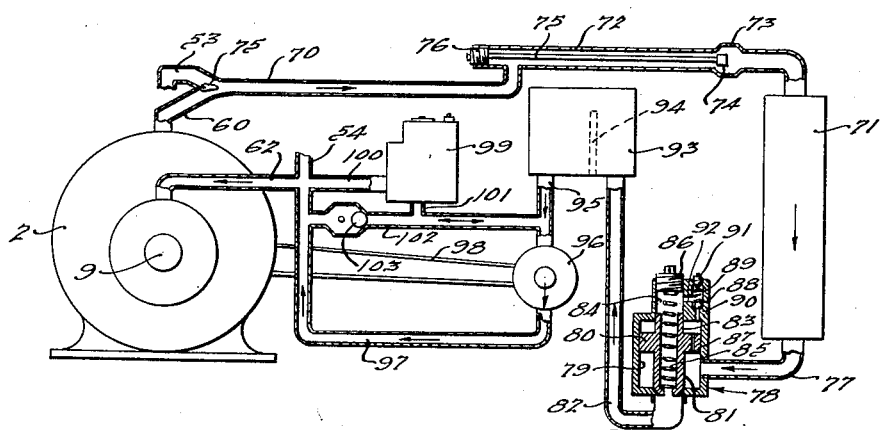

Figures 5, 6 and 7 are fragmentary sections taken on the lines 5—5, 6—6 and 7—7, respectively, of Figure 2;

Figure 8 is a perspective view of one of the blades, showing the mounting lugs thereon; and Figure 9 is a diagrammatic view, showing the improved fluid circulating system external to the converter.

As best shown in Figure 1, the improved torque converter is provided with a stationary housing formed of two sections, 1 and 2, joined together in a central transverse plane by means of a plurality of bolts 3. Housing section 1 supports a pair of roller bearings 4 and 5, which bearings journal an input shaft 6 and absorb both radial and end thrust loads thereon. Similar bearings 7 and 8, mounted within the housing section 2, journal an output shaft 9.

Integrally formed on the input shaft 6 is a radially extending flange 10; while a similar flange 11, of somewhat smaller radial extent, is integrally formed on the output shaft 9. As shown in the drawings, the confronting faces of the flanges 10 and 11, in conjunction with the confronting faces of the inner portions of the housing sections 1 and 2, are so shaped as to form a torus- or doughnut-shaped cavity coaxial with the shafts 6 and 9, in accordance with standard hydrokinetic torque converter construction. The outer edges of the flanges 10 and 11 are provided with rearwardly projecting stepped rims 12 and 13, which project axially into similarly shaped annular recesses in the housing sections 1 and 2, respectively, to form a labyrinth-type seal for the central torus-shaped cavity.

The input shaft 6 carries what is in effect a centrifugal pump formed by a plurality of blades 14, which blades are secured at one edge to the flange 10, by means of rivets 15 or otherwise, and which are secured together at their opposite edges by an annular ring 16, which is likewise riveted to the blades.

Positioned centrally within the torus-shaped cavity is an annular structure built up of a number of annular members, including the previously mentioned ring 16, a similar ring 17, a channel-shaped ring 18 and a ring 19. As a result, the liquid within the cavity, which is circulated by the centrifugal pump blades 14, circulates within the cavity and around the central annular structure, and in the course of such circulation passes through the blades of what is in effect a three-stage turbine carried by the flange 11 of the output shaft 9. Thus, the liquid discharged from the outer edges of the blades 14 first strikes the first set of turbine blades 20, then is redirected by a set of stationary reaction blades 21 to a second set of turbine blades 22 and thence through a second set of stationary reaction blades 23 to a third stage of turbine blades 24. The third stage of turbine blades is carried directly by and between the flange 11 and the annular ring 17, with the result that the ring 17 is secured to and moves with the flange 11. The channel-shaped ring 18 is secured to the outer periphery of the ring 17 by means of a plurality of cap screws 25. One flange of the channel-shaped ring 18 is connected to the inner ends of the second stage of blades 22, the outer ends of the blades 22 being connected together by a ring 26. The other flange of the channel-shaped ring 18 supports the inner ends of the first stage of turbine blades 20, the outer ends of which are connected together by a ring 27. As a result of this arrangement, the shaft 9, flange 11, blades 24, ring 17, ring 18, blades 22, ring 26, blades 20 and ring 27 all rotate in unison.

An important feature of the invention resides in the novel construction and mounting of the blades 20, 21, 22, 23 and 24, which are best shown in Figures 2, 5, 6, 7 and 8. Thus, as best shown in Figure 8, the blades 20 are provided with rectangular lugs 28 projecting from the side edges of the blades and extending in a direction generally parallel to the chord of the convex side of the blades. As best shown in Figures 2 and 6, the radially extending flange 29 of the channel-shaped ring 18 is provided at its outer edge with an axially extending flange 30, through which is cut a plurality of angularly disposed slots 31 adapted to receive the lugs 28 on the inner edges of the blades 20. The bottoms of the slots 31 are located to the right of the outer surface 32 of the main portion of the radial flange 29 of ring 18, in order to provide clearance or run-out for the milling or other tool used to cut the slots 31. In order to fill the space thus left adjacent the inner edges of the blades 20 and thus provide a smooth path for the circulation of liquid, annular ring 33, which just fills the space, is secured against the outer side of the radial flange 29 by means of screws or otherwise, in the manner best shown in Figure 2. The lugs 28 on the outer edges of the blades 20 are similarly fitted within slots which extend entirely through the previously mentioned ring 27. The lugs 28 may be secured against displacement from the slots 31 in the channel-shaped ring 18 and the similar slots in the ring 27 in any suitable manner, such as by silver soldering or copper hydrogen brazing.

The remaining sets of blades 21, 22, 23 and 24 are similarly constructed and mounted. Thus, the stationary reaction blades 21 are provided with lugs 34 at their outer edges, which fit within angularly disposed slots 35 in a ring 36 which is clamped between the flanges of the housing sections 1 and 2. The lugs 34 on the inner edges of the blades 21 are positioned within similar slots in an annular projection formed integrally with the ring 19. The annular projection does not appear in Figure 2, but corresponds in shape and location with the inner lug 34 as it appears in Figure 2 of the drawings. The notched-out spaces at either side of the annular projection are filled by smooth annular rings 37 and 38, which are secured by screws to the ring 19 and serve to prevent turbulence in the circulated liquid. The blades 22 have the lugs at their inner sides positioned within slots in an axially projecting flange 39 on the radial flange 40 of the ring 18. A pair of rings 41 is secured to the flange 40 and fills the gaps which are required for run-out of the slotting tool at the ends of the slots. The lugs at the outer sides of the blades 22 are similarly positioned within slots 42, which extend entirely across the ring 26.

The lugs at the outer edges of the stationary reaction blades 23 are fitted within slots which extend entirely across a ring 43, which is fitted within an annular channel-shaped recess 44 in the housing section 2. The lower inner side of the ring 43, as viewed in Figure 2, is cut away to provide run-out for the slotting tool, and the cut-away space is filled by a ring 45. Cap screws 46 secure the ring 45 in position against the ring 43 and thus hold the latter in the recess 44. The lugs at the inner edges of the blades 23 are positioned within slots within a ring 47. The lugs at the outer edges of the blades 24 are secured to slots 48 formed in the flange 11, and the lugs at the inner edges of the blades 24 are fitted within similar slots 49 formed in the annular ring 17. The tool run-out clearance spaces for the slots 48 and 49 are filled by rings 50 and 51, respectively, in the manner best shown in Figure 2.

The general location and arrangement of the blades 14, 20, 21, 22, 23 and 24 are conventional except that the inner ends of the first stage of reactionary blades 21 are rigidly supported by the ring 19 and associated structure to enhance the strength and ruggedness of the construction, and except for the method employed to mount the blades 20, 21, 22, 23 and 24. The particular mounting construction described above is far more rigid and secure than the conventional expedient of securing such blades in position by riveting, in that the blades are supported for substantially their full length and, therefore, the mounting device is not subject to excessive forces tending to rotate the blades. This form of mounting is peculiarly advantageous for a torque converter which may be subject to high-speed reverse rotation of the turbine member, because the turbine and reaction blades are designed for maximum efficiency when the flow of liquid relative to the blades is in the direction encountered on forward rotation of the turbine. At high reverse speeds the turbine will act as a pump, but in such case the flow of liquid relative to the blades is reversed. As a result, the blades are subject to severe impact loads, particularly at their trailing edges. The conventional riveted mounting is not adequate to resist these forces. In addition, it will be noted that since the rectangular blade lugs extend substantially parallel to the blades, they extend approximately normal to the forces acting on the blades. As a result, there is little or no tendency of the lugs to slide lengthwise in the securing slots. Furthermore, since the elongated mounting lugs distribute the mounting loads over the major portions of the side edges of the blades, they make it possible to utilize thinner and, therefore, more efficient blade sections without unduly weakening the construction. Except for this fact, the exact form of the blades may be determined in accordance with known principles to meet the speeds and conditions of operation.

In connection with hydrokinetic torque converters, it is necessary to provide means for circulating and cooling the operating liquid in order to dissipate the heat generated therein. For this purpose, it is the conventional practice to provide a circulating system which permits the discharge of a portion of the liquid from the outer portion of the housing through a port 52, to which is connected a suitable fluid conduit 53. The liquid is then passed through a cooling radiator and then returned by means of a pump through a conduit, such as the conduit 54, to the torus-shaped cavity at a point adjacent the inner ends of the pump blades 14. The fluid from conduit 54 passes through a suitable port 55 in the housing into an annular chamber 56 and thence through one or more ports 57 in the inner portion of the flange 10 adjacent the inner ends of the blades 14. A conventional bellows-type seal, indicated generally at 58, is employed to prevent leakage of the operating liquid from the annular space 56 along shaft 6.

An important feature of the present converter resides in the fact that in addition to the above described discharge and inlet connections for the operating liquid, there is provided a second set of discharge and inlet connections at the opposite side of the converter to insure an adequate circulation of the liquid and prevent cavitation when the turbine or output shaft 9 is rotating in reverse, and to generally increase the rate of circulation to insure adequate cooling under severe operating conditions. Thus, the housing section 2 is provided with a duplicate discharge port 59, which is larger than port 52 and which is connected to a discharge conduit 60. The housing is also provided with a fluid inlet port 61 connected to a second inlet conduit 62 and communicating with an annular space 63 within the housing. The annular space 63 is connected to the torus-shaped cavity by a plurality of passageways 64 extending through the inner portion of the flange 11. A bellows-type seal 65 prevents leakage from the cavity 63 along the shaft 9.

As will be brought out in greater detail hereinafter, as a result of the above construction the operating liquid may discharge from either or both of the conduits 53 and 60 and is returned to the converter under pressure through both of the inlet conduits 54 and 62.

As a further means to prevent cavitation of the liquid in the converter, the inlet ports 57 are provided with scoops 66, the open entry mouths thereof being faced forwardly with respect to the direction of rotation of the input shaft 6 and thus tending to scoop the liquid within the annular cavity 56 and force it through the ports 57. The entry port 64 on the turbine element, as best shown in Figures 1 and 3, are also provided with scoops 67, but in this case the scoops are double-acting, since they are provided with oppositely facing openings 69 and 69'. Each of the scoops 67 is provided with a flap valve 68 which is free to pivot back and forth from the dotted line to the solid line position illustrated in Figure 3 in order to direct fluid entering either one of the mouths 69 and 69' into the entry port 64. As the result of this construction, the scoops 67 are effective to pick up the liquid and deliver it to the entry of the converter, regardless of the direction of rotation of the turbine or output shaft 9.

When the converter is being used with a hoist to brake a falling load, the turbine member 11 may rotate in reverse at high speed while the pump member 12 rotates forwardly at slow speed. Under these circumstances, the turbine acts as a centrifugal pump and reverses the flow through the converter. Since the turbine is an inefficient pump, more heat will be generated and, therefore, more liquid should be circulated through the cooling system. However, the reverse circulation reduces the pressure at port 52 and would materially reduce the circulation through the cooling system if port 52 were the only discharge port. By providing a larger port 59 at what is then the highest pressure region, this difficulty is overcome. In addition, under these circumstances the slow speed of the pump 12 reduces the quantity of liquid fed into the converter by scoop 66. However, the deficiency is made up by scoop 67, which is then rotating at high speed and supplies the intake liquid for the reversely operating turbine 11. When it is desired to stop the falling load, the speed of the pump element 12 is increased. This increases the rate of heat generation but reduces the circulation within the converter. It is then important to discharge the maximum quantity of liquid through the cooling system. This is taken care of by the fact that the increase in the pump speed increases the pressure at port 52 and permits discharge through both ports.

The fluid circulating, cooling and pressure control system of the present invention is illustrated more or less diagrammatically in Figure 9. As there shown, the outlet conduits 53 and 60 join a common conduit 70. A pivoted or flap valve 75 is provided at the juncture of the conduits 53 and 60 in order to prevent flow from either of the last two mentioned conduits into the other without preventing flow from either or both of said conduits into conduit 70. The fluid discharged into conduit 70 is delivered to a cooling radiator 71, preferably by way of a thermostatic valve. Any suitable form of thermostatic valve capable of opening to progressively increasing degrees in response to increases in the temperature of the liquid may be employed. The particular form illustrated comprises an elongated tube 72 having an enlarged section 73 in which is located a valve head 74. Head 74 is secured to one end of an elongated rod 75 which extends concentrically through a substantial length of the tubular member 72 and is adjustably secured to the latter by means of a screw plug 76 at one end. The valve head 74 is preferably of slightly less diameter than the interior of tube 72, but is so located that at ordinary atmospheric temperatures it materially restricts the flow of liquid into the radiator 71. The tubular member 72 and the rod 75 are made of different metals, such as steel and aluminum, respectively, the metal of which the tube is formed having a lower coefficient of thermal expansion than the material of the rod 75, with the result that on increases in temperature the rod will elongate to a greater extent than the tube and thus reduce the restriction offered by the valve head 74 to flow of liquid into the radiator. As an alternative construction, it will be apparent to those skilled in the art that if the head 74 is normally located at the right-hand side of the enlargement 73, rather than the left-hand side, as illustrated in the drawings, the material of which the tube 72 is formed may have the higher thermal coefficient of expansion without altering the results obtained.

In any event, the function of the thermostatic valve is to restrict the circulation of fluid through the cooling system and thus increase the efficiency of the torque converter when the temperature of the operating liquid thereof is low, but to permit an increased circulation and thus increased dissipation of heat when the temperature is high. The cooling radiator 71 may be of any suitable or conventional design, and should be equipped in the usual manner with an air circulating fan, not shown. The fan may be driven from any suitable source of power, but is preferably differentially driven from the input and output shafts of the torque converter, in accordance with the disclosure of applicant's copending application, Serial No. 666,626, filed May 2, 1946, with the result that its speed is proportional to the extent that the speed ratio of the converter departs from the ratio of maximum efficiency.

In order to maintain the liquid within the radiator under pressure above atmospheric and thus minimize vaporization of the heated liquid within the radiator, a back pressure creating valve is interposed in the discharge conduit 77 of the radiator and is adjusted to maintain a back pressure for this purpose. While any suitable form of back pressure valve may be employed, a common form of back pressure valve 78 suitable for this purpose is illustrated in the drawings. As there shown, valve 78 includes a casing having a cylindrical bore 79 in which is fitted a piston 80, which carries a hollow valve plunger 81 adapted to control a discharge port which is in communication with an outlet conduit 82. A cylindrical projection 83 on the opposite side of the piston 80 is of the same diameter as the valve plunger 81 and is fitted within a reduced cylindrical bore 84 formed in the upper portion of the casing. The hollow plunger contains a relatively light spring 85, which bears at one ends on an internal shoulder formed on the lower end of the valve plunger and at the opposite end on an adjustable plug 86, by means of which the tension may be adjusted.

The piston 80 is by-passed by a small bleed opening 87, with the result that the fluid on the lower side of the piston may pass through the bleed opening into the space above the piston and thus tend to balance the pressures acting on the piston. The pressure acting on the upper side of the piston is controlled by a small spring-biased ball check valve 88, including a spring 89 which normally acts to urge the ball valve against its seat and thus close a passageway 90 which communicates with the space above the piston 80. The space above the ball check valve 88 is connected in any desired manner to a source of low or atmospheric pressure. In this instance, this result is achieved by a side passageway 92, which connects the chamber above the valve 88 to the bore 84, since the latter is in unrestricted communication with the low pressure or atmospheric liquid reservoir or tank 93 through the hollow valve plunger 81 and the conduit 82.

The ball check valve 88 may be adjusted by means of a threaded plug 91 to maintain the pressure in the space above the piston 80 at any desired value. As a result of this construction, the pressure within the space above the piston 80 may be maintained at any desired value and the valve plunger 81 will automatically assume a position at which the difference between the pressure acting on the underside of the piston and that acting on the upper side of the piston just balances the force exerted by the spring 85. As a result, the pressure in line 77 and thus within the radiator 71 will be maintained constant at any desired value, depending upon the adjustment of the plug 91. The liquid discharged past the back pressure valve 78 passes through the conduit 82 and enters the reservoir or tank 93, which is preferably in communication with the atmosphere to permit dissipation of any vapor which may form when the pressure of the liquid is reduced at valve 78. The reservoir 93 may be provided with any suitable arrangement of baffles, such as the baffle indicated diagrammatically at 94.

The liquid from the tank 93 is normally delivered through a conduit 95 to the inlet of a pump 96, which delivers the liquid under pressure through a conduit 97 and the branch conduits 54 and 62, previously described, to the inlet ports 55 and 61 of the converter. The pump 96 may be driven in any suitable manner, as by means of a belt 98 from the input shaft 6 of the converter.

If desired, the pump 96 may be a centrifugal pump, in which event no further means are required to control the supply of liquid to the converter inlet ports. However, it is preferred to deliver the liquid to the converter at a relatively high pressure, and for this purpose a positive displacement pump is less expensive. Accordingly, in the preferred form of invention illustrated diagrammatically in Figure 9, the pump 96 is a positive displacement pump, such as a vane or gear pump, and suitable means are provided for by-passing a portion of the fluid discharged by the pump in order to meet the varying needs of the system and for controlling the inlet pressure of the liquid. This means, as shown in Figure 9, comprises a pressure relief valve 99 which is identical in construction and mode of operation to the previously described back pressure valve 78, and hence need not be further described in detail except to note that its inlet port is connected by means of a conduit 100 to the line 97 and its outlet or discharge port is connected by a short conduit 101 to a conduit 102 which connects the previously mentioned conduits 95 and 97 and contains a ball check valve 103 which will permit flow from conduit 95 to conduit 97 but will prevent reverse flow from conduit 97 to either of the conduits 101 or 95. The relief valve 99 is adjusted to limit the pressure at conduit 100 and, therefore, at the inlets to the converter to the maximum desired value, and will automatically maintain the pressure at the converter inlets at that pressure so long as the capacity of the pump 96 exceeds the fluid flow requirements of the converter, the excess liquid being discharged through conduits 100 and 102 back to the intake of the pump 96 and thus recirculated.

If the volumetric capacity of the positive displacement pump 96 is made sufficient to take care of the maximum fluid flow requirements of the converter, there would be no need for the check valve 103 and its associated connections. However, it is preferable to utilize a pump of somewhat smaller volumetric capacity than the maximum possible requirements and it is also desirable to provide fluid flow connections capable of supplying liquid to the converter inlets independently of the pump for emergency purposes. Accordingly, the check valve 103 and associated connections permit flow from the tank 93 into the converter inlets at any time that the pressure at the converter inlets drops to approximately atmospheric pressure. Under these circumstances, the fluid flows from the tank through conduit 102, the check valve 103, the upper end of conduit 97 and the conduits 54 and 62 to the converter independently of the pump. If the tank 93 is elevated above the converter, so as to provide a static pressure head, flow through the branch path 102 either with or without simultaneous flow through the pump and conduit 97 is facilitated.

It will be observed that the above circulating cooling system not only maintains a superatmospheric pressure on the liquid in the cooling radiator and an independently adjustable pressure head on the inlet ports of the torque converter under all normal conditions, but permits the separation of vapor from the circulating liquid in the tank and automatically varies the rate of flow of liquid not only in accordance with the pressures developed by the converter pump and turbine elements, which pressures are in general a function of the speed of these elements and, therefore, of the waste heat generated, but also varies the rate of circulation in accordance with changes in the temperature of the liquid. In this latter connection, it will be noted that since the valve 78 maintains a constant pressure within the radiator and, therefore, at the right-hand side of the thermostatic valve 74, as viewed in Figure 9, the rate of flow past the valve 74 for any given position of the valve head will vary in accordance with the pressure head developed at the discharge outlets of the converter. In addition, for any given pressure head at the converter outlets, the rate of flow will vary in accordance with variations in the temperature of the liquid by reason of the movements of the valve 74.

While only one form of the invention is shown and described herein, it will be apparent to those skilled in the art that variations in the details of design and construction may be made without departing from the spirit of the invention or the scope of the appended claims.

What is claimed is:

1. A hydrokinetic torque converter, including a centrifugal pump element and a turbine element and a housing co-operating to form a torus-shaped fluid chamber having a central core structure around which the fluid circulates in passing through the pump and turbine elements, said housing having a pair of radially extending discharge ports located in axially spaced relation on opposite sides of the plane of said core structure and communicating with the interior of said chamber radially outward of the blades of the pump and turbine elements, an inlet passageway communicating with the interior of said chamber radially inward of the blades of said pump and turbine elements, and an external fluid circulating and cooling apparatus connecting said discharge ports with said inlet passageway.

2. A hydrokinetic torque converter, including a centrifugal pump element and a turbine element and a housing co-operating to form a torus-shaped fluid chamber having a central core structure around which the fluid circulates in passing through the pump and turbine elements, said housing having a pair of radially extending discharge ports located in axially spaced relation on opposite sides of the plane of said core structure and communicating with the interior of said chamber radially outward of the blades of the pump and turbine elements, an inlet passageway communicating with the interior of said chamber radially inward of the blades of said pump and turbine elements, and an external fluid circulating and cooling apparatus connecting said discharge ports with said inlet passageway, said circulating apparatus including a conduit connection between said discharge outlets and a valve effective to prevent flow from one of said outlets into the other through said connection.

3. A hydrokinetic torque converter, including a centrifugal pump element and a turbine element and a housing co-operating to form a torus-shaped fluid chamber having a central core structure around which the fluid circulates in passing through the pump and turbine elements, said housing having a pair of radially extending discharge ports located in axially spaced relation on opposite sides of the plane of said core structure and communicating with the interior of said chamber radially outward of the blades of the pump and turbine elements, a pair of inlet passageways extending into the chamber from opposite sides thereof at points located radially inward of the blades of the pump and turbine elements, and an external fluid circulating and cooling apparatus connecting said discharge ports with said inlet passageways.

4. A hydrokinetic torque converter, including a centrifugal pump element and a turbine element and a housing co-operating to form a torus-shaped fluid chamber having a central core structure around which the fluid circulates in passing through the pump and turbine elements, said housing defining a fluid inlet chamber external to said first mentioned chamber, means for supplying fluid to the inlet chamber, said pump element having an inlet passageway therethrough connecting the inlet chamber to the first chamber at a point radially inwardly of the pump blades, and a forwardly directed scoop mounted on said pump element in conjunction with said inlet passageway for forcibly directing fluid into the first chamber in response to forward rotation of said pump element.

5. A hydrokinetic torque converter, including a centrifugal pump element and a turbine element and a housing co-operating to form a torus-shaped fluid chamber having a central core structure around which the fluid circulates in passing through the pump and turbine elements, said housing defining a fluid inlet chamber external to said first mentioned chamber, means for supplying fluid to the inlet chamber, said turbine element having an inlet passageway therethrough connecting the inlet chamber to the first chamber at a point radially inwardly of the turbine blades, a scoop mounted on said turbine element in conjunction with said inlet passageway and having mouths facing both forwardly and backwardly for forcibly directing fluid into the first chamber in response to forward or reverse rotation of said turbine element, and a valve for preventing fluid from entering from one of said mouths and discharging from the other.

6. A hydrokinetic torque converter, including a centrifugal pump element and a turbine element and a housing co-operating to form a torus-shaped fluid chamber having a central core structure around which the fluid circulates in passing through the pump and turbine elements, said housing defining a pair of fluid inlet chambers external to said first mentioned chamber and spaced axially therefrom on opposite sides thereof, said pump element having an inlet passageway therethrough connecting one of the inlet chambers to the first chamber at a point radially inwardly of the pump blades, a forwardly directed scoop mounted on said pump element in conjunction with said inlet passageway for forcibly directing fluid into the first chamber in response to forward rotation of said pump element, said turbine element having an inlet passageway therethrough connecting the other inlet chamber to the first chamber at a point spaced radially inwardly of the turbine blades, a scoop mounted on said turbine element in conjunction with said last mentioned inlet passageway and having mouths facing both forwardly and backwardly for forcibly directing fluid into the first chamber in response to forward or reverse rotation of said turbine element, and a valve associated with said last mentioned scoop for preventing fluid from entering from one of said mouths and discharging from the other.

7. A fluid cooling system for a hydrokinetic torque converter having fluid inlet and discharge ports, including a cooling radiator having its inlet connected to the converter discharge opening, an atmospheric pressure reservoir, a conduit connecting the outlet of the radiator to the reservoir, a back pressure creating valve in said last mentioned conduit for maintaining a substantially constant superatmospheric pressure in the radiator and converter, and a pump having its inlet connected to the reservoir and its outlet connected to the converter inlet port.

8. A fluid cooling system for a hydrokinetic torque converter having fluid inlet and discharge ports, including a cooling radiator having its inlet connected to the converter discharge opening, an atmospheric pressure reservoir, a conduit connecting the outlet of the radiator to the reservoir, a back pressure creating valve in said last mentioned conduit for maintaining a substantially constant superatmospheric pressure in the radiator and converter, a positive displacement pump having its inlet connected to the reservoir and its outlet connected to the converter inlet port, and a pressure relief valve for limiting the pressure of the fluid delivered to the converter inlet port and having a conduit for returning excess fluid to the inlet of the pump.

9. A fluid cooling system for a hydrokinetic torque converter having fluid inlet and discharge ports, including a cooling radiator having its inlet connected to the converter discharge opening, an atmospheric pressure reservoir, a conduit connecting the outlet of the radiator to the reservoir, a back pressure creating valve in said last mentioned conduit for maintaining a substantially constant superatmospheric pressure in the radiator, a pump having its inlet connected to the reservoir and its outlet connected to the converter inlet port, a conduit connecting the reservoir to the converter inlet port independently of the pump, and a check valve in the last mentioned conduit for preventing flow therein in a direction toward said reservoir.

10. A fluid cooling system for a hydrokinetic torque converter having fluid inlet and discharge ports, including a cooling radiator having its inlet connected to the converter discharge opening, an atmospheric pressure reservoir, a conduit connecting the outlet of the radiotor to the reservoir, a back pressure creating valve in said last mentioned conduit for maintaining a substantially constant superatmospheric pressure in the radiator, a positive displacement pump having its inlet connected to the reservoir and its outlet connected to the converter inlet port, a pressure relief valve for limiting the pressure of the fluid delivered to the converter inlet port and having a conduit for returning excess fluid to the inlet of the pump, a conduit connecting the reservoir to the converter inlet port independently of the pump, and a check valve in the last mentioned conduit for preventing flow therein in a direction toward said reservoir.

11. A fluid cooling system for a hydrokinetic torque converter having fluid inlet and discharge ports, including a cooling radiator having its inlet connected to the converter discharge opening, a thermostatic valve in the connection between the converter discharge port and the radiator and effective to restrict the flow opening through the connection to progressively increasing degrees as the temperature of the liquid discharged by the converter increases and vice versa, an atmospheric pressure reservoir, a conduit connecting the outlet of the radiator to the reservoir, a back pressure creating valve in said last mentioned conduit for maintaining a substantially constant superatmospheric pressure in the radiator, and a pump having its inlet connected to the reservoir and its outlet connected to the converter inlet port.

CHARLES M. O'LEARY.

REFERENCES CITED

The following references are of record in the file of this patent:

UNITED STATES PATENTS

| Number | Name | Date |
|---|---|---|
| 766,519 | Perkins | Aug. 2, 1904 |
| 811,639 | Holmgren | Feb. 6, 1906 |
| 927,658 | Kemble | July 13, 1909 |
| 1,074,691 | Bruman | Oct. 7, 1913 |
| 1,366,605 | Steenstrup | Jan. 25, 1921 |
| 1,398,461 | Kerr | Nov. 29, 1921 |
| 1,934,936 | Lysholm | Nov. 14, 1933 |
| 2,115,895 | Weihmann | May 3, 1938 |
| 2,140,324 | Lysholm | Dec. 13, 1938 |
| 2,142,199 | Lysholm et al. | Jan. 3, 1939 |
| 2,144,596 | Daiber | Jan. 17, 1939 |
| 2,187,656 | Kiep et al. | Jan. 16, 1940 |
| 2,221,678 | Heckman | Nov. 12, 1940 |
| 2,255,284 | Gorrie | Sept. 9, 1941 |
| 2,343,304 | La Brie | Mar. 7, 1944 |
| 2,372,326 | Hewitt | Mar. 27, 1945 |
| 2,405,135 | Butzbach | Aug. 6, 1946 |